United States Patent
Rabra et al.

(10) Patent No.: US 8,755,775 B2
(45) Date of Patent: Jun. 17, 2014

(54) VIRTUAL NUMBER GATEWAY

(75) Inventors: Arun Rabra, Faridabad (IN); Sanjay Gupta, Faridabad (IN); Sharad Kumar, Noida (IN); Madhavi Gupta, Gurgaon (IN)

(73) Assignee: Comviva Technologies Limited, New Delhi (IN)

( * ) Notice: Subject to any disclaimer, the term of this patent is extended or adjusted under 35 U.S.C. 154(b) by 83 days.

(21) Appl. No.: 13/509,096

(22) PCT Filed: Nov. 11, 2010
(Under 37 CFR 1.47)

(86) PCT No.: PCT/IB2010/002879
§ 371 (c)(1),
(2), (4) Date: Jul. 23, 2012

(87) PCT Pub. No.: WO2011/058419
PCT Pub. Date: May 19, 2011

(65) Prior Publication Data
US 2012/0282903 A1    Nov. 8, 2012

(30) Foreign Application Priority Data
Nov. 11, 2009    (IN) ............................ 2326/DEL/2009

(51) Int. Cl.
*H04M 3/42*    (2006.01)
(52) U.S. Cl.
USPC ........................................................ 455/414.1
(58) Field of Classification Search
USPC ........................................................ 455/414.1
See application file for complete search history.

(56) References Cited

U.S. PATENT DOCUMENTS

| | | | |
|---|---|---|---|
| 5,960,340 A * | 9/1999 | Fuentes | 455/417 |
| 8,532,695 B2 * | 9/2013 | Suetsugu et al. | 455/550.1 |
| 2003/0125072 A1 * | 7/2003 | Dent | 455/551 |
| 2003/0186676 A1 * | 10/2003 | Ogman et al. | 455/403 |
| 2004/0110465 A1 * | 6/2004 | Bedingfield et al. | 455/3.05 |
| 2004/0152442 A1 * | 8/2004 | Taisto et al. | 455/406 |
| 2004/0180676 A1 | 9/2004 | Haumont et al. | |
| 2004/0198355 A1 * | 10/2004 | Kim et al. | 455/435.1 |
| 2005/0192035 A1 * | 9/2005 | Jiang | 455/461 |
| 2005/0277407 A1 * | 12/2005 | Ahn et al. | 455/414.1 |
| 2006/0094451 A1 * | 5/2006 | Lee | 455/461 |
| 2007/0105531 A1 * | 5/2007 | Schroeder | 455/411 |
| 2008/0081617 A1 * | 4/2008 | Yoo et al. | 455/433 |
| 2009/0163244 A1 | 6/2009 | Parkkinen et al. | |
| 2010/0128857 A1 * | 5/2010 | Logan | 379/88.22 |
| 2013/0157716 A1 * | 6/2013 | Khan | 455/551 |
| 2013/0183949 A1 * | 7/2013 | Sulmar | 455/415 |

FOREIGN PATENT DOCUMENTS

GB    2 408 179 A    5/2005

* cited by examiner

*Primary Examiner* — Nathan Mitchell
(74) *Attorney, Agent, or Firm* — Maschoff Brennan

(57) ABSTRACT

An embodiment of a communication system for associating at least one virtual phone number with a mobile device is disclosed. The mobile device is pre-associated with a real phone number and owned by a first subscriber and the at least one virtual phone number is associated with a second subscriber. The system includes a virtual phone platform configured to activate one or more communication services for the at least one virtual phone number. The one or more communication services are simultaneously available to the at least one virtual phone number and the real phone number via the mobile device subsequent to the activation.

10 Claims, 5 Drawing Sheets

VIRTUAL NUMBER GATEWAY

FIELD OF THE INVENTION

This invention, in general, relates to the field of mobile communication. More particularly, the invention relates to a method and system for enabling a user to avail mobile communication services without having to own a mobile device or a subscriber identity module (SIM).

BACKGROUND OF THE INVENTION

In a typical mobile communication network, subscribers to mobile communication services access operator network by using a unique identification module that contains subscriber information. Such identification module is configured in a mobile device (also referred to as "mobile handset" For example, in a GSM (Global System for Mobile Communication) network, each subscriber owns a SIM (Subscriber Identity Module) card and a mobile device. The SIM card stores information relating to subscriber identity such as the IMSI (International Mobile Subscriber Identity Number) unique to the subscriber. In addition, the mobile device is identified by a unique IMEI (International Mobile Equipment Identity Number). In other words, the subscriber cannot access the GSM network and avail the communication services without the SIM card and a compatible environment such as the mobile device.

Now, one or more network operators (or service providers) offer SIM cards for a cost based on predetermined terms and conditions. In addition, a number of mobile device manufacturers have emerged who offer mobile devices with variety of features and cost ranges. In a nutshell, to avail the communication services of the GSM network, one has to own a mobile phone and/or a SIM card.

In some of the developing nations of the world, such costs for owning a SIM card and a mobile device may not be affordable for common man with meager wages. It may also be desirable otherwise to associate more than one SIM cards with a single mobile device. Conventional solutions provide SIM cards that support two mobile phone numbers on a single SIM card. Such a solution eliminates the need of owning two devices and SIM cards, hence reduces cost incurred. However, the limitation with such a solution is that both the numbers permanently resides on the same SIM thereby mandating a requirement of owning at least one SIM card and the mobile handset.

In lot of emerging markets of the world, income levels of people are low due to several reasons and hence a substantial segment of the population may not be able to bear the cost associated with buying a mobile handset and/or a SIM card. For instance, a critical segment of the consumer base for mobile communication services in such nations represent low income and entry-level consumers who earn less than US $2 a day and find communication services expensive in relation to individual incomes. Such segments of population are deprived of the benefits of communication services merely due to cost.

Additionally, mobile devices and SIM cards have gained popularity among masses and owners need to take special care of the device to prevent any theft or misappropriation thereof. Some of the mobile handsets may be bulky, occupy considerable space, and would have several other limitations with regard to network coverage, roaming services, etc. that vary with different network operators. One of the major requirements for advancement of social and economic development of rural areas is to enable low-income groups to access the latest information and services at an affordable price without much complexities.

It may also be desirable for the network operators or service providers to profitably roll out innovative services with price points tailored to income and consumption patterns of entry-level user segment.

Existing solutions and systems have not been satisfactory in addressing the aforementioned issues and hence, there remains a well felt need for a system and method to allow users with options to avail communication services provided by network operators without having to own a SIM card or a mobile handset.

SUMMARY OF THE INVENTION

It is an object of the present invention to provide for a solution to at least the aforementioned problems in the art.

In particular, it is an object of the present invention to provide for a method to allow virtual phone subscribers to avail one or more communication services without having to own a mobile device or a SIM card.

It is another object of the present invention to provide a method and system for associating at least one virtual phone number with a mobile device which is pre-associated with a real phone number (corresponding to a SIM card).

It is also an object of the present invention to provide one or more subscribers (subscribed to one or more virtual numbers respectively) to simultaneously avail communication services using a single mobile device that is pre-associated with a real phone number.

It is another object of the present invention to propose for a method and system that allows a subscriber associated with the virtual phone number to access one or more communication services without deactivating communication services available to a real number pre-associated with the mobile device.

It is yet another object of the invention to maintain virtual number profile, permanent register subscriber, and current activation subscriber.

It is a further object of the invention that the virtual phone services be applicable for existing subscribers (prepaid/postpaid).

Still further object of the present invention is to provide multiple registration options, activation options, deactivation options, and customization options for the virtual phone subscribers.

It is also object of the invention to provide a system to receive communications for a given Mobile Number on an associated mobile device, wherein the given mobile number is either a real phone number or a virtual phone number.

Accordingly, a communication system for associating at least one virtual phone number with a mobile device is disclosed. The mobile device is pre-associated with a real phone number and owned by a first subscriber and the at least one virtual phone number is associated with a second subscriber. In an embodiment, the system includes a virtual phone platform configured to activate one or more communication services for the at least one virtual phone number. The one or more communication services are simultaneously available to the at least one virtual phone number and the real phone number via the mobile device subsequent to the activation.

According to an embodiment a method for associating at least one virtual phone number with a mobile device is disclosed wherein the mobile device is pre-associated with a real phone number and owned by a first subscriber and the at least one virtual phone number associated with a second subscriber. The method includes registering at least one virtual phone number responsive to a registration request from the mobile device, the registration request being initiated by providing a pre-fix code while dialing a recipient phone number; and activating one or more communication services for the at least one virtual phone number in such a manner that the real phone number and the at least one virtual phone number simultaneously co-exist in a mobile communication network for availing the one or more communication services via the mobile device and the services rendered to the virtual phone number are charged from the virtual phone number account.

According to yet another embodiment a system for making a call from a mobile device using one or more virtual phone numbers wherein the mobile device is pre-associated with a real phone number, wherein one or more communication services being simultaneously available to the at least one virtual phone number and the real phone number via the mobile device is disclosed. The system includes a virtual phone gateway configured to receive a first initial address message (IAM) from a message switching center (MSC). The virtual phone gateway generate a corresponding second IAM comprising the virtual phone number and a destination phone number; and send the second IAM to the message switching center (MSC). The message switching center (MSC) receive a calling request from the mobile device on behalf of the one or more virtual phone number wherein the calling request comprising a pre-fix code and a destination number. On receiving the call the message switching center (MSC) generate the corresponding first IAM comprising the real phone number, the pre-fix code, and the destination number. The message switching center (MSC) then send the first IAM to the virtual phone gateway, receive the second IAM from the virtual phone gateway; and forward the second IAM to a message switching center (MSC) gateway. The message switching center (MSC) gateway is configured to receive the second IAM from MSC and route the call request based on the second IAM to the destination phone number. The system further comprises an invoice module configured to maintain an account associated with the virtual phone number; and charging the account for the calling request based on pre-determined terms and conditions.

According to yet another embodiment a system for receiving a call for one or more virtual phone numbers associated with a mobile device wherein the mobile device being pre-associated with a real phone number, wherein one or more communication services being simultaneously available to the at least one virtual phone number and the real phone number via the mobile device is disclosed. The system comprising a message switching center (MSC) gateway configured to receive an initial address message (IAM) corresponding to a calling request from a calling phone number to be received at the mobile device; responsive to the IAM, send request for routing information associated with the calling request, to a home location register (HLR); receive a mobile station routing number (MSRN) from the HLR; and route the calling request to the mobile switching center (MSC) corresponding to the MSRN. The HLR is further configured to receive request for routing information associated with the calling request from the MSC gateway; send a mobile application part (MAP) message for obtaining roaming number to a virtual phone gateway; receive the mobile station routing number (MSRN) from the virtual phone gateway; and send the mobile station routing number (MSRN) to the MSC gateway. The virtual number gateway is configured to receive the mobile application part (MAP) message for obtaining roaming number; send the mobile application part (MAP) message for obtaining roaming number to the MSC; receive the mobile station routing number (MSRN) from the MSC; and send the mobile station routing number (MSRN) to the HLR. The MSC is configured to receive the mobile application part (MAP) message for obtaining roaming number from the virtual phone gateway; send the mobile station routing number (MSRN) to the virtual phone gateway; receive routed call request from the MSC gateway; and routing the call request to the mobile device associated.

According to yet another embodiment a method for making a call from a mobile device pre-associated with a real phone number using one or more virtual phone number is disclosed. The mobile device being in communication with a message switching gateway wherein one or more communication services being simultaneously available to at least one virtual phone number and the real phone number. The method comprising steps of prefixing a recipient's phone number with a pre-fix code while initiating the call from the mobile device, identifying the virtual phone number associated with the prefixed code at a virtual phone gateway, based on identification, associating the virtual phone number identification to the call and forwarding the call to the recipient's phone number, displaying the virtual phone number at a caller ID of the recipient's phone and charging the virtual phone number for the services used.

These and other advantages and features of the present invention will become more apparent from the following description and appended claims, or may be learned by the practice of the invention as set forth hereinafter. To the accomplishment of the above and related objects, this invention may be embodied in the form illustrated in the accompanying drawings, attention being called to the fact, however, that the drawings are illustrative only, and that changes may be made in the specific embodiments illustrated.

BRIEF DESCRIPTION OF THE DRAWINGS

To further clarify the above and other advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in which.

DESCRIPTION OF THE INVENTION

Figure 1:
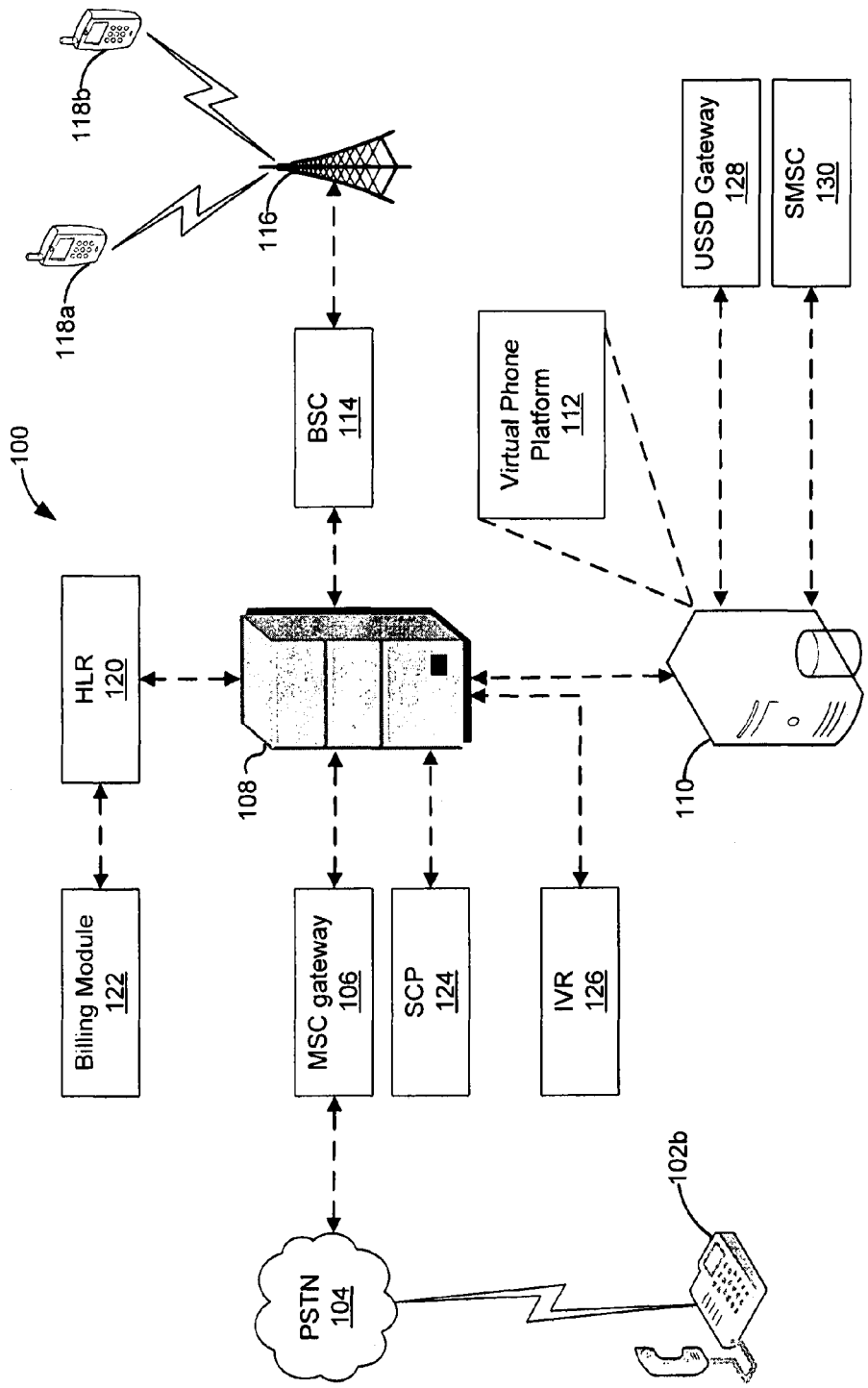
FIG. 1 shows an exemplary communication system for associating at least one virtual phone number with a mobile device according to an embodiment of the present invention.

Disclosed systems and methods provide a solution for the above mentioned shortcomings in the art. The disclosed system proposes an approach that enables at least one floating number (herein after referred to as "virtual phone number" in the specification) to rest/reside on any handset associated with a "real phone number" (or Subscriber Identity Module or SIM) provided by a given network operator. In an embodiment, the virtual phone number and the real phone are provided by the same network operator. However, it may be appreciated by those skilled in the art that different operators may collaboratively provide virtual phone service without departing from the scope of the disclosed systems and methods. For example, a virtual phone number provided by network operator "A" may be supported on a mobile device that is pre-associated with a real phone number provided by network operator "B". Custom modifications and techniques for such collaborative models are well known in the art and need no elaboration in the ongoing description. The disclosed communication system provides a virtual phone subscriber with a unique virtual number that is compatible with any real phone subscriber's handset thereby allowing new users to exercise a presence on the network without having to own the handset and/or the SIM. Thus, for availing communication services in, for example, a GSM network the requirement of owning a SIM and a handset is eliminated. Advantageously, such a communication system provides an opportunity for network operators to offer communication services to those who cannot buy a handset or a SIM due to the cost involved therein. In addition, the disclosed approach also benefits the existing subscribers by allowing postpaid users to use virtual number as a pre paid one for their personal use.

The proposed approach is referred as 'virtual phone' for description purposes. As mentioned hereinbefore, 'virtual phone' offers the opportunity to new customers to own a prepaid number without owning a mobile handset or a SIM card. Further, virtual phone provides the possibility of making a call from the virtual number or receiving a call for a virtual number, and refill airtime without owning the SIM and mobile handset. Thus, user subscribed to the virtual phone service can access a network "A" using any handset pre-associated with the network "A". In other words, the present approach permits simultaneous use of both the numbers i.e. the virtual phone number and the real phone number (associated with the SIM) pre-associated with the handset from which the virtual phone service is accessed. The virtual number and user identification number (real number) associated with SIM can be concurrently used.

In an exemplary embodiment, multiple virtual phone numbers can be associated with a real phone number (or SIM). In such an embodiment, the multiple virtual phone numbers and the real phone number avail the communication services simultaneously. It is to be noted here that such an approach reduces the cost of going mobile drastically and connects the masses to the network and enable them to access information. The communication services may correspond to standard services, such as, a call making and receiving service, a short message service (SMS), call waiting service, call forwarding service, and missed call alert. It may be appreciated that additional value added service (VAS) may be included by the operator without departing from the scope of the disclosed invention.

Exemplary Communication System

Referring now to FIG. 1, an exemplary communication system 100 is illustrated that associates at least one virtual phone number with a mobile device according to an embodiment of the present invention. The exemplary communication system architecture corresponds to Global System for Mobile Communications (GSM) architecture that shows a call route between a land phone 102 via a Public Switch Telephone Network (PSTN) 104 through a mobile switching center (MSC) gateway 106 with the cellular network. As shown in the figure, the cellular network includes a message switching center 108 configured to route calls between one or more mobile devices or land phones.

The communication system 100 further includes a virtual phone gateway 110 that implements a virtual phone platform 112 in accordance with an embodiment of the present invention. The virtual phone platform 112 is configured to register at least one virtual phone number and manage an account for the virtual phone subscriber owning the at least virtual phone number. In a preferred embodiment, the at least one virtual phone number corresponds to a pre-paid floating number. The virtual phone platform 112 is further configured to activate one or more communication services for the at least one virtual phone number. In the exemplary embodiment, the virtual phone gateway 110 provides the one or more communication services simultaneously to the at least one virtual phone number and a real phone number pre-associated with a mobile device via the mobile device.

The communication system 100 further includes one or more standard blocks of a GSM network. For example, the system 100 may include a base station controller (BSC) 114 in communication with a mobile tower (base station) 116 to provide mobile communication services to one or mobile devices (phones) 118a and 118b. The BSC also communicates with the MSC 108. Further, FIG. 1 shows a Home location register (HLR) 120 in communication with the MSC 108 a billing module 122. The communication system further includes a service control point (SCP) 124 and an interactive voice response (IVR) block 126.

In an exemplary embodiment, the registration requests, activation requests and deactivation requests associated with the at least one virtual number correspond to unstructured supplementary service data (USSD) messages. To this end, the system 100 includes a USSD gateway 128. The system 100 also includes a short message service center (SMSC) block 130 to allow registration requests, activation requests, and deactivation requests by way of short messages.

It may be appreciated that various blocks of the network such as the IVR 126, the SCP 124, the USSD Gateway 128, the SMSC 130, the HLR 120, and the billing module 122 operate in a conventional manner. The virtual phone gateway 110 carries out the virtual phone call routing procedures in conjunction with the various other blocks of the communication system in accordance with the principles of the disclosed invention.

The communication system 100 may also include an authorization module (not shown) to authorize creating and deletion of an association between virtual phone number and real phone number. The association between the virtual phone number and real phone number can happen dynamically. Further, the authorization module may facilitate auto expiration of the association after a predetermined time. However, it should be appreciated that FIG. 1 does not restrict the implementation of the present invention to the environment shown and can be implemented in various other environments.

Exemplary Virtual Phone Platform

Figure 2:
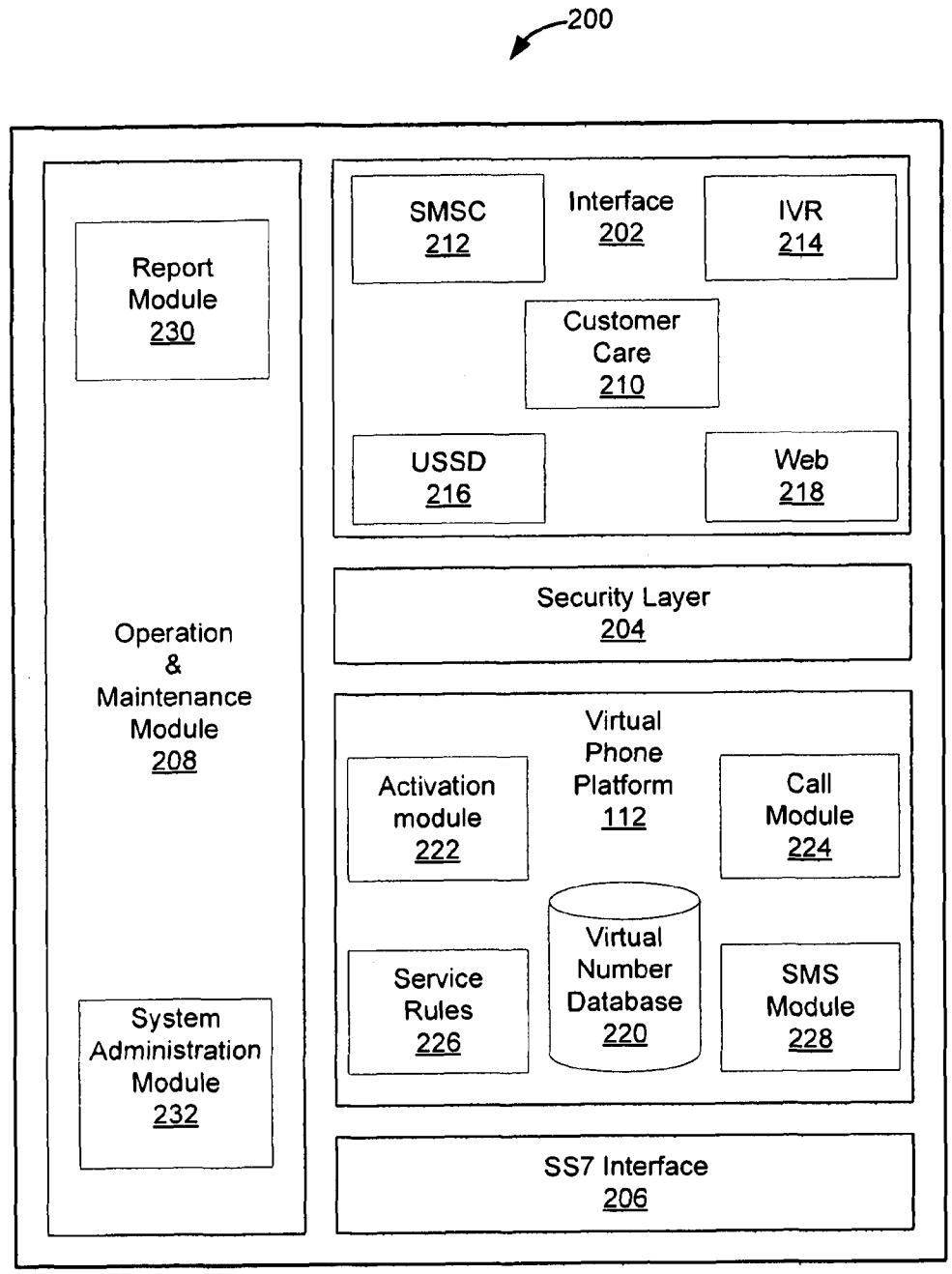
FIG. 2 shows an example architecture for virtual phone platform in accordance with an embodiment of the present invention.

FIG. 2 shows an example virtual phone platform architecture that may reside in the virtual phone gateway 110 of FIG. 1 in an embodiment. As illustrated, in this embodiment, the virtual phone platform 112 includes an activation module 222 configured to activate one or more communication services for the at least one virtual phone number without deactivating the one or more communication services previously available for the real phone number. The virtual phone platform 112 is configured to register the virtual phone number upon receipt of a registration request from the virtual phone subscriber via the mobile device. The virtual phone platform 112 issues a virtual phone number and a personal identification number (PIN) responsive to the registration request. The virtual phone gateway 110 provides options for IVR registration for new subscribers, USSD registration for new subscribers, SMS registration for new subscribers, IVR registration for existing subscribers, USSD registration for existing subscribers, SMS registration for existing subscribers. Likewise, the activation module 222 is configured to provide options for IVR interaction service initiating, USSD based service initiation, SMS based service initiation, etc.

The virtual phone number further includes a call module 224 configured to handle call processing related Integrated Services Digital Network User Part (ISUP) messages. The call module 224 is further configured to determine a calling number and a called number from a service request sent by a virtual phone subscriber.

The virtual phone platform further includes service rules 226 that handle conditional aspects of the one or more communication services activated for the virtual phone number. The virtual phone platform 112 further includes a virtual number database 220 configured to store and maintain a database of a plurality of virtual phone numbers corresponding to plurality of virtual phone subscribers. The virtual phone platform 112 also includes a SMS module 228 configured to handle messages associated with short message service (SMS) from (or to) the virtual phone subscribers. In an exemplary embodiment, the one or more communication services includes a call making service, a call receiving service, a short message service (SMS), call waiting service, call forwarding service, missed call alert service, and call diverting service.

The call module 224 also handles the call processing related ISDN User Part (ISUP) messages, such as Initial Address Message (IAM) and is responsible for obtaining calling and called numbers. The SMS module 228 handles the SMS processing related messages like SRI (Send Routing Information) and is responsible for obtaining sender's and receiver's messages.

In addition, as illustrated in FIG. 2, the virtual phone architecture 200 includes a SS7 (Signaling System 7) interface 206 that provides connectivity to the communication network. Further, the virtual phone architecture 200 includes one or more interfaces 202. For example, the interface 202 may correspond to an SMSC interface 212, an IVR interface 214, a customer care interface 210, USSD interface 216, and web interface 218. The virtual phone architecture 200 also includes a security layer 204 for implementing security policies as determined by the network operator.

The IVR interface 214 is configured to play announcement, to activate/deactivate subscriber of the virtual phone service. The customer care interface 210 is configured to activate/deactivate the subscribers and to solve customer queries if any. The SMSC interface 212 is configured to facilitate message sending to the end party. Thus, any virtual phone subscriber can send/receives SMS.

The virtual phone platform can be configured to allow value added services (VAS) to deliver services to the virtual number as to a real number, without requiring any specific handling. In addition, a prepaid balance is maintained for the virtual number. The virtual phone gateway 110 maintains an account balance to credit and debit for communication services used by the virtual phone subscriber.

Further, the virtual phone platform 112 is operationally connected to an operation and maintenance module 208. The operation and maintenance module 208 handles the maintenance related ISUP messages such as RESET. In an implementation, the operation and maintenance module 208 handles the tasks of maintenance of voice circuits, RESET/BLO/UBL messages, informing CP (Call Processing) about state of circuits, allocation of free circuit for CP etc. Furthermore, the operation and maintenance module 208 includes a report-generating module 230 that generates several reports that can be generated to analyze traffic flow and system performance. The operation and maintenance module 208 also includes a system administration module 232 configured to provide administration rights to network administrator appointed by the network operator.

The value added services include, but not limited to, IVR interaction service closing, USSD interaction service initiating, USSD interaction service closing, maximum idle time service closing, PIN Code change, physical SIM and virtual number concurrent service usage, call forwarding, administrator and customer care GUI (Graphic User Interface) with lots of functionalities, reports on various parameters, interoperability of other value added services (VAS) services like missed call alert, caller ring back tones.

Figure 3:
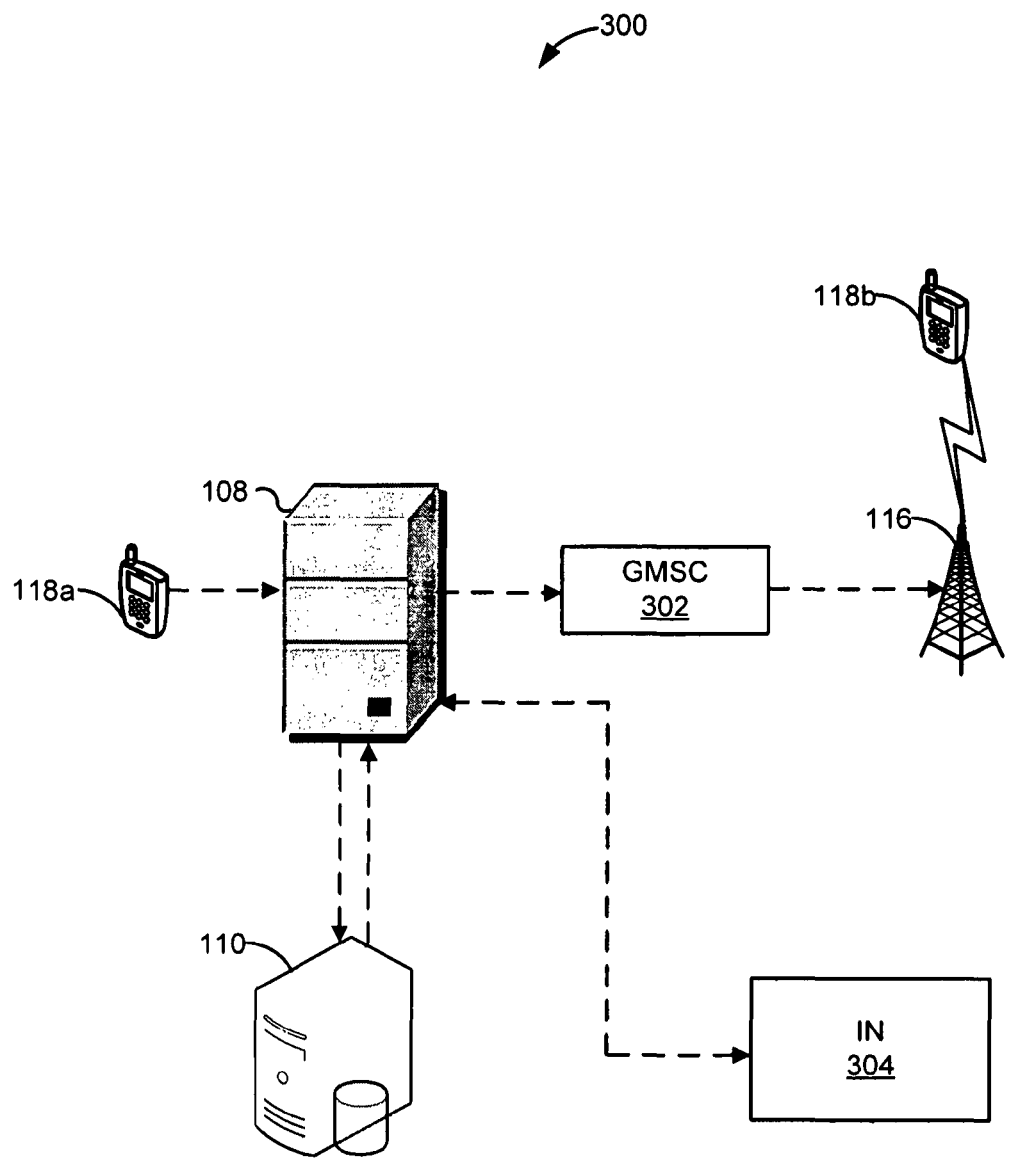
FIG. 3 illustrates an example call flow diagram for a mobile originating call in accordance with an embodiment of the present invention.

In order to achieve the proposed approach, it is the principal object of the present invention to provide a virtual phone mobile originating call that is based on prefix-based dialing. FIG. 3 is an example call flow diagram illustrating a call flow for a mobile originating call in accordance with the principles of the present invention. As shown, in an implementation, a party dials a prefix before the actual number (e.g. *123#987654321) to call from any virtual phone using the mobile device 108a. The originator of the call is identified/displayed at caller ID of the recipient as the virtual number. The call lands up in the MSC 108 and subsequent to checking the prefix of the number, the MSC 108 routes the call to virtual phone gateway 110. In this implementation, the virtual phone platform application 112 stored in virtual phone gateway 110 changes the A and B party number and forwards the call to MSC 108, which finally does the normal routing through GMSC 302 to the destination mobile device 118b via the base station 116. Further, the MSC 108 is configured to separately bill Intelligent Network IN 304 for the communication services used by the virtual phone subscriber. Accordingly, the virtual phone subscriber's account is charged and not the real phone number account.

FIG. 3 also illustrates a system 300 for making a call from a mobile device 118a using one or more virtual phone numbers. The mobile device 118a is pre-associated with a real phone number and one or more communication services are simultaneously available to the at least one virtual phone number and the real phone number via the mobile device. Accordingly, the system 300 includes a virtual phone gateway 110 configured to: receive a first initial address message (IAM) from the message switching center (MSC) 108, generate a corresponding second IAM comprising the virtual phone number and a destination phone number; and send the second IAM to the message switching center (MSC).

The system 300 also includes the message switching center (MSC) 108 configured to: receive a calling request from the mobile device 118a on behalf of the one or more virtual phone number, the calling request including a pre-fix code and a destination number. The MSC 108 is further configured to generate the corresponding first IAM comprising the real phone number, the pre-fix code, and the destination number. The MSC 108 is configured to send the first IAM to the virtual phone gateway 110, to receive the second IAM from the virtual phone gateway 110, and to forward the second IAM to the message switching center (MSC) gateway 302.

The GMSC 302 is configured to: receive the second IAM from MSC 108 and route the call request based on the second IAM to the destination phone number.

The system 300 further includes an invoice module (intelligent network) 304 configured to: maintain an account associated with the virtual phone number and charge the account for the calling request based on pre-determined terms and conditions.

Figure 4:
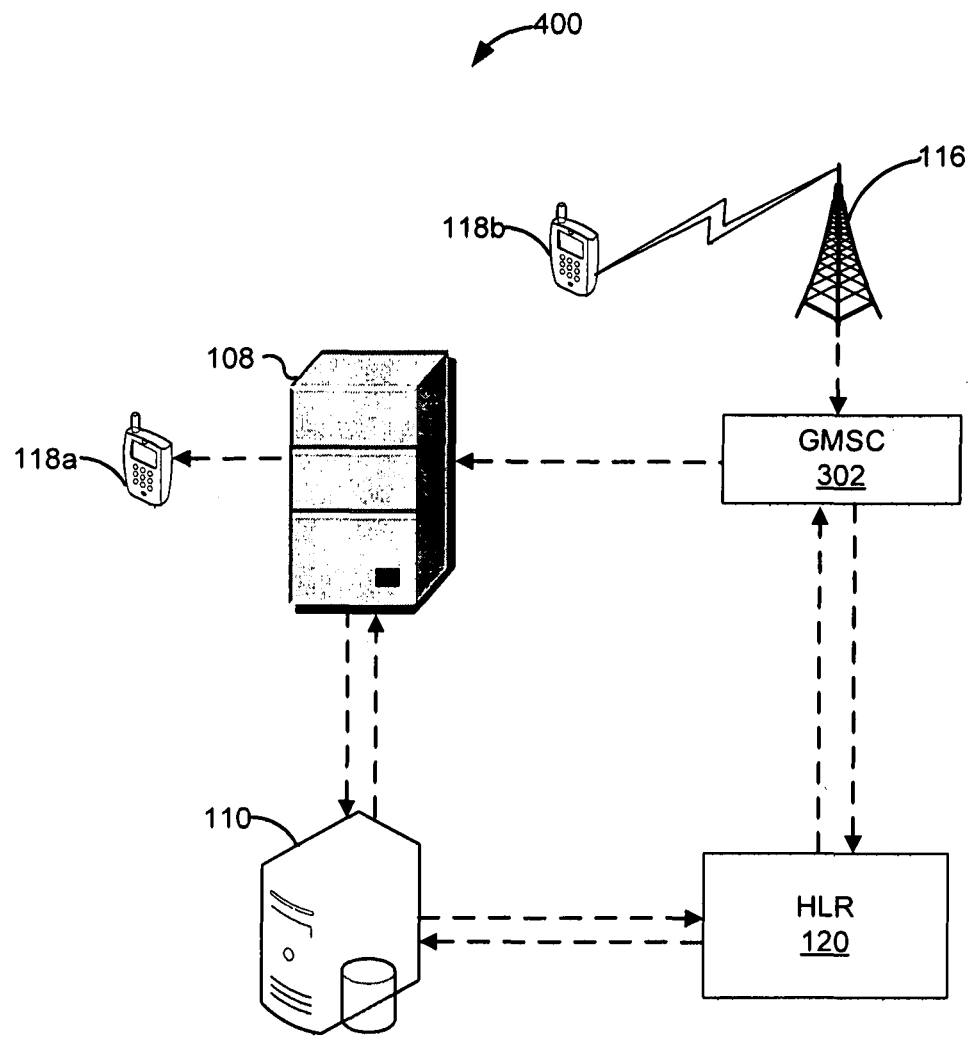
FIG. 4 illustrates an example call flow diagram for a mobile terminated call in accordance with another embodiment of the present invention.

FIG. 4 illustrates a system 400 for receiving a call for one or more virtual phone numbers associated with a mobile device 118a. The mobile device 118a is pre-associated with a real phone number in such a manner that one or more communication services are simultaneously available to the at least one virtual phone number and the real phone number via the mobile device.

Accordingly, the system 400 includes the message switching center (MSC) gateway 302 is configured to receive an initial address message (IAM) corresponding to a calling request from a calling phone number (118b). The GMSC 302 is also configured to send request for routing information associated with the calling request to a home location register (HLR) 120 responsive to the IAM. Further, the GMSC 302 is configured to receive a mobile station routing number (MSRN) from the HLR 120 and route the calling request to the mobile switching center (MSC) 108 corresponding to the MSRN.

The system 400 also includes the HLR 120 configured to receive request for routing information associated with the calling request from the MSC gateway 302 and send a mobile application part (MAP) message for obtaining roaming number to a virtual phone gateway 110. The HLR 120 is also configured to receive the mobile station routing number (MSRN) from the virtual phone gateway 110 and send the mobile station routing number (MSRN) to the MSC gateway 302.

The virtual number gateway 110 is configured to receive the mobile application part (MAP) message for obtaining roaming number and send the mobile application part (MAP) message for obtaining roaming number to the MSC 108. The virtual number gateway 110 receives the mobile station routing number (MSRN) from the MSC 108 and sends the mobile station routing number (MSRN) to the HLR 120.

The MSC 108 is configured to receive the mobile application part (MAP) message for obtaining roaming number from the virtual phone gateway 110 and send the mobile station routing number (MSRN) to the virtual phone gateway 110. Further, the MSC 108 is configured to receive routed call request from the MSC gateway 302 and route the call request to the mobile device 118a.

The system 400 can be configured to hold\store messages and missed or notified calls when the given mobile number (virtual phone number) is not associated with the mobile device 118a. When the association is established, the missed or notified call and messages are delivered to the associated mobile number.

Figure 5:
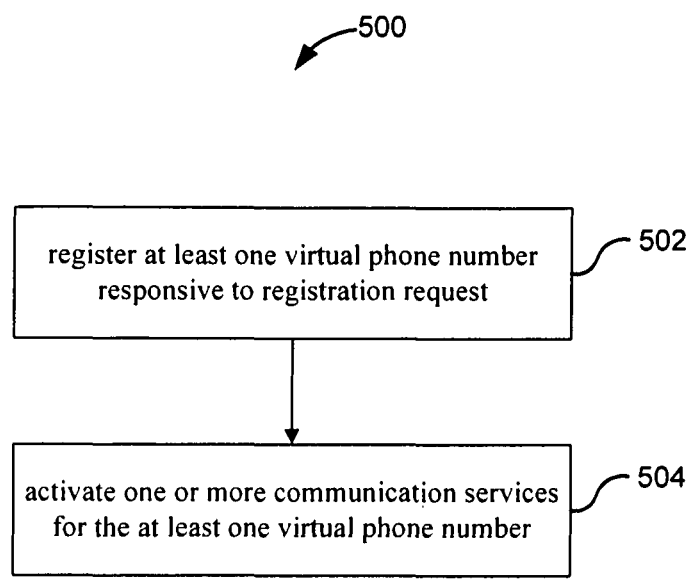
FIG. 5 illustrates an exemplary method for associating at least one virtual phone number with a mobile device.

FIG. 5 illustrates a method 500 for associating at least one virtual phone number with a mobile device. The mobile device (e.g. 118a) is pre-associated with a real phone number and owned by a first subscriber and the at least one virtual phone number is associated with a second subscriber.

At block 502, at least one virtual phone number is registered responsive to a registration request from the mobile device. As described above, the virtual phone subscriber sends a registration requests via the mobile device 118a. In an embodiment, the registration request corresponds to one or more of requests via an interactive voice response (IVR), Unstructured Supplementary Service Data (USSD), and short message service (SMS).

At block 504, one or more communication services for the at least one virtual phone number are activated in such a manner that the real phone number and the at least one virtual phone number simultaneously co-exist in a mobile communication network for availing the one or more communication services via the mobile device. In other words, the activation of the one or more services is performed without deactivating the one or more services available to the real phone number prior to activation.

In yet another implementation, the method 500 includes separately billing the first subscriber and the second subscriber for the communication services associated with the real phone number and the virtual phone number respectively.

It may be appreciated that multiple virtual phone numbers can be activated on the mobile device without deactivating the communication services available to the real phone number prior to activation. In other words, the activated virtual phone numbers and the real phone numbers simultaneously avail the communication services on a first come first basis.

Advantageously, virtual phone service can capitalize on current community-based communication services consumption models prevalent among low-ARPU customers to achieve universal service goals. The virtual phone service unbundles handset ownership from individual subscriptions and lowers the total cost of mobile ownership, enabling operators to address gaps in market efficiency. Assuming a monthly income of US $60 and average saving rate of 10%, low-income mobile users need to invest their entire 5 months savings to purchase a US $30 handset. The time to buy a handset extends further when one takes into account that users would need to set apart a certain portion of their savings for other contingencies. In comparison, the virtual phone accelerates the time to go mobile, enabling users to own an individual connection in one-sixth of the time. Further, the virtual phone design is affordable as the existing infrastructure is used. In addition, the accessibility is easy through regular means i.e. through operator's subscriber phone and acceptability is smooth due to voice driven easy to use operations.

It will be appreciated that the teachings of the present invention can be implemented as a combination of hardware and software. The software is preferably implemented as an application program comprising a set of program instructions tangibly embodied in a computer readable medium. The application program is capable of being read and executed by hardware such as a computer or processor of suitable architecture. Similarly, it will be appreciated by those skilled in the art that any examples, functional block diagrams and the like represent various exemplary functions, which may be substantially embodied in a computer readable medium executable by a computer or processor, whether or not such computer or processor is explicitly shown. The processor can be a Digital Signal Processor (DSP) or any other processor used conventionally capable of executing the application program or data stored on the computer-readable medium.

The example computer-readable medium can be, but is not limited to, (Random Access Memory) RAM, (Read Only Memory) ROM, (Compact Disk) CD or any magnetic or optical storage disk capable of carrying application program executable by a machine of suitable architecture. It is to be appreciated that computer readable media also includes any form of wired transmission. Further, in another implementation, the method in accordance with the present invention can be incorporated on a hardware medium using ASIC or FPGA technologies.

It is also to be appreciated that the subject matter of the claims are not limited to the various examples and or language used to recite the principle of the invention, and variants can be contemplated for implementing the claims without deviating from the scope. Rather, the embodiments of the invention encompass both structural and functional equivalents thereof.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

We claim:

1. A method for associating at least one virtual phone number with a mobile device, the mobile device being pre-associated with a real phone number and owned by a first subscriber and the at least one virtual phone number associated with a second subscriber, the method comprising:
   registering at least one virtual phone number responsive to a registration request from the mobile device, the registration request being initiated by providing a pre-fix code while dialing a recipient phone number; and
   activating one or more communication services for the at least one virtual phone number in such a manner that the real phone number and the at least one virtual phone number simultaneously co-exist in a mobile communication network for availing the one or more communication services via the mobile device and the services rendered to the virtual phone number are charged from the virtual phone number account.

2. The method as claimed in claim 1, wherein the registration request corresponds to one or more of requests via. an interactive voice response (TVR), Unstructured Supplementary Service Data (USSD), and short message service (SMS).

3. The method as claimed in claim 1 comprises separately billing the first subscriber and the second subscriber for the communication services associated with the real phone number and the virtual phone number respectively.

4. A system for making a call from a mobile device using one or more virtual phone numbers, the mobile device being pre-associated with a real phone number, wherein one or more communication services being simultaneously available to the at least one virtual phone number and the real phone number via. the mobile device, the system comprising;
   a virtual phone gateway configured to:
      receive a first initial address message (IAM) from a message switching center (MSC);
      generate a corresponding second IAM comprising the virtual phone number and a destination phone number; and
      send the second IAM to the message switching center (MSC);
   the message switching center (MSC) configured to:
      receive a calling request from the mobile device on behalf of the one or more virtual phone number, the calling request comprising a pre-fix code and a destination number;
      generate the corresponding first IAM comprising the real phone number, the pre-fix code, and the destination number; send the first IAM to the virtual phone gateway;
      receive the second IAM from the virtual phone gateway; and
      forward the second IAM to a message switching center (MSC) gateway;
   the message switching center (MSC) gateway configured to:
      receive the second IAM from MSC; and
      route the call request based on the second IAM to the destination phone number; and an invoice module configured to:
      maintain an account associated with the virtual phone number; and
      charging the account for the calling request based on predetermined terms and conditions.

5. A system for receiving a call for one or mote virtual phone numbers associated with a mobile device, the mobile device being pre-associated with a real phone number, wherein one or more communication services being simultaneously available to the at least one virtual phone number and the real phone number via. the mobile device, the system comprising the system comprising;
   a message switching center (MSC) gateway configured to:
      receive an initial address message (IAM) corresponding to a calling request from a calling phone number to be received at the mobile device;
      responsive to the IAM, send request for routing information associated with the calling request, to a home location register (IILR);
      receive a mobile station routing number (MSRN) from the HLR; and
      route the calling request to the mobile switching center (MSC) corresponding to the MSRN;
   the HLR configured to:
      receive request for routing information associated with the calling request from the MSC gateway;
      send a mobile application part (MAP) message for obtaining roaming number to a virtual phone gateway;
      receive the mobile station routing number (MSRN) from the virtual phone gateway; and
      send the mobile station routing number (MSRN) to the MSC gateway;
   the virtual number gateway configured to;
      receive the mobile application pan (MAP) message for obtaining roaming number,
      send the mobile application part (MAP) message for obtaining roaming number to the MSC;
      receive the mobile station routing number (MSRN) from the MSC; and
      send the mobile station routing number (MSRN) to the HLR; the MSC configured to:
      receive the mobile application part (MAP) message for obtaining roaming number from the virtual phone gateway; send the mobile station routing number (MSRN) to the virtual phone gateway;
      receive routed call request from the MSC gateway; and
      routing the call request to the mobile device associated.

6. A method for making a call from a mobile device being pre-associated with a real phone number using one or more virtual phone number, the mobile device being in communication with a message switching gateway wherein one or more communication services being simultaneously available to at least one virtual phone number and the real phone number, the method comprising steps of;
   prefixing a recipient's phone number with a pre-fix code while initiating the call Item the mobile device;
   identifying the virtual phone number associated with the prefixed code at a virtual phone gateway;
   based on identification, associating the virtual phone number identification to the call and forwarding the call to the recipient's phone number; and
   displaying the virtual phone number at a caller ID of the recipient's phone and charging the virtual phone number for the services used.

7. A method as claimed in claim 6 further comprising receiving the call at a message switching center and then routing the call to the virtual phone gateway based on the presence of the pre-fix code in the call.

8. A method as claimed in claim 6 further comprising forwarding the call to a message switching center gateway for routing the call to the recipient's mobile device.

9. A method as claimed in claim 6 comprising pre-storing the pre-fix code of the virtual phone number at a data repository of the virtual phone gateway for determining a phone number as a virtual phone number.

10. A method as claimed in claim 6 wherein directing a call to a message switching center gateway based on the absence of pre-fix code in the call.

* * * * *